Dec. 7, 1926.

H. D. COLLIER 1,609,697

SYSTEM AND APPARATUS FOR DISCHARGING LUBRICANTS FROM MOTOR VEHICLES

Filed Feb. 9, 1924　　5 Sheets-Sheet 1

Inventor
Henry Deward Collier
By Lyon & Lyon
Attorneys

Patented Dec. 7, 1926.

1,609,697

UNITED STATES PATENT OFFICE.

HENRY DEWARD COLLIER, OF SAN FRANCISCO, CALIFORNIA, ASSIGNOR TO STANDARD OIL COMPANY, OF SAN FRANCISCO, CALIFORNIA, A CORPORATION OF CALIFORNIA.

SYSTEM AND APPARATUS FOR DISCHARGING LUBRICANTS FROM MOTOR VEHICLES.

Application filed February 9, 1924. Serial No. 691,861.

This invention relates to systems and apparatus whereby lubricant may be discharged from motor vehicles. This invention is particularly useful for discharging spent lubricant from motor vehicles, but is likewise useful for discharging lubricant which has not been spent or exhausted.

As is well known, motor vehicles are provided with different parts holding supplies of lubricant so as to efficiently lubricate certain vital parts of the mechanism of the vehicle. For example, the crank case of the motor, and the gear cases of the change speed mechanism and differential are adapted to hold supplies of lubricant which, in the course of time and use, become contaminated or spent. It has always been good practice to change this spent lubricant after the vehicle has run a predetermined number of miles. This change of the lubricant in the crank case is especially important, because of the dilution or contamination thereof by raw gasoline and combustion products from the engine cylinders.

To drain these different parts of the vehicle in which lubricant is carried, it has been customary to provide a drain opening in the lower part of the case and to close said opening with a plug which is removed when drainage is desired. To effect such drainage, it is at present necessary for a person to get under the vehicle and remove the plug. It is customary at present to place a bucket or other vessel under the drain opening to catch the spent lubricant as it issues from the case. It will be evident that the operations just described require a considerable amount of time and inconvenience to the operator of the vehicle.

Operators of motor vehicles customarily have their vehicles charged with supplies of lubricant and gasoline at filling stations. It is desirable that means be provided whereby spent lubricant may be conveniently drawn from motor vehicles at such filling stations. This will naturally induce the operator to change the lubricant in his vehicle at frequent intervals and will obviate a tendency now existent of motor vehicle operators to neglect proper change of the lubricant due to the inconvenience required by the present practice as above outlined.

An object of the present invention is to expedite the drainage of lubricant from motor vehicles, thus avoiding the necessity of the vehicle being out of service for more than a few minutes.

Another object of the invention is to provide a system and apparatus for discharging lubricant from motor vehicles readily adaptable for embodiment as part of the equipment of a motor vehicle filling station.

Another object is to easily and quickly discharge the lubricant into a reservoir so that said lubricant may be reclaimed or otherwise disposed of.

Another object is to make it possible to detachably connect a lubricant eduction tube to the part of any vehicle that it is desired to drain of the lubricant which it holds.

Another object is to provide for discharge of the lubricant into a container that will hold the entire charge and to then automatically effect discharge of such lubricant from the container.

Other objects and advantages of the invention will appear from the following description of illustrative means embodying the same.

Figure 1:
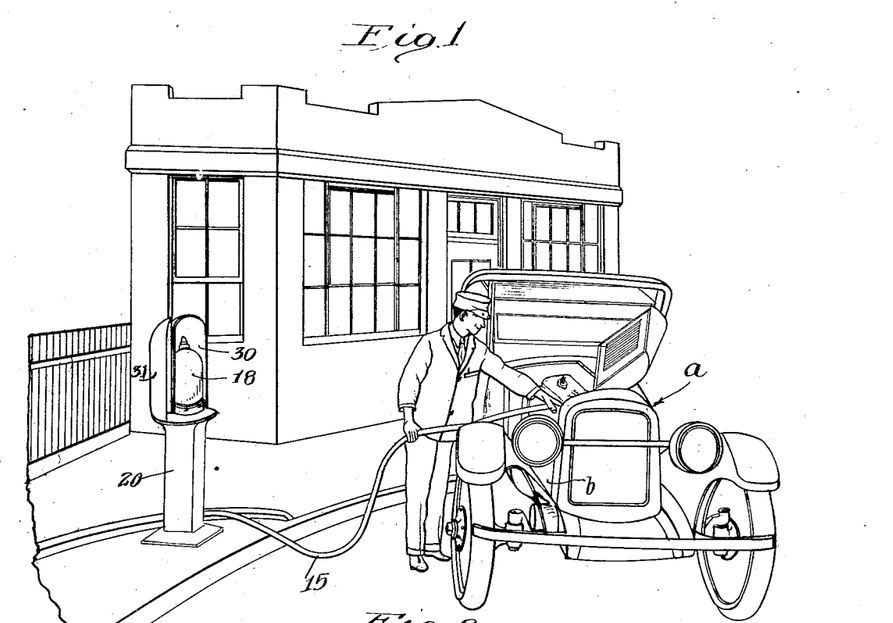
Fig. 1 is a perspective view of a filling station in connection with which an apparatus embodying the invention is shown in part, some portions of the apparatus being hidden from view in the station and in the earth. A motor vehicle is shown with the hood raised and the lubricant eduction tube of the apparatus in position to discharge lubricant from the crank case of the engine.
Figure 2:
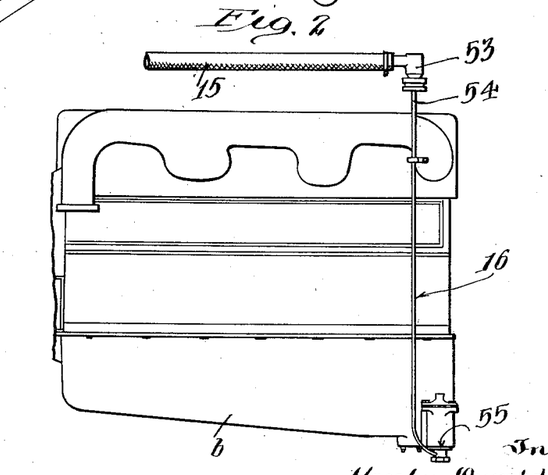
Fig. 2 is a side elevation of the engine of the motor vehicle shown in Fig. 1, together with a fragment of the eduction tube and the means for detachably connecting said eduction tube to the drain opening of the crank case.

Referring to Figs. 1 to 4 of the drawings, there is provided a lubricant eduction tube or hose 15 wherewith to effect drainage of lubricant from whatever part of the vehicle is to be supplied with fresh lubricant. In Fig. 1 the motor vehicle, indicated at $a$, is shown with its crank case $b$ connected by suitable means, indicated in general by the character 16, to the eduction tube 15. It will be understood that the connection means 16 may be of any suitable construction and those disclosed in the drawings will be more fully described hereinafter as typical of various means that may be used.

There are provided means to produce a relatively lower pressure in the eduction tube 15 than on the lubricant in the part or member that is to be drained of said lubricant. For example the crank case $b$ may be such member. These means may be variously constructed and reference will now be made to Fig. 3 of the drawings in which is illustrated one form of the apparatus. In this view, to effect a difference of pressure in the eduction tube and upon the lubricant in the crank case or other member containing said lubricant, said eduction tube discharges at 17 into the upper portion of a container 18 which, in this instance, is formed in part by a bell jar constructed of glass. The bell jar 18 is mounted on a suitable base 19 which constitutes the bottom of the container and thus the container is a closed one. The base 19 is mounted on a suitable hollow standard 20 through which a portion of the eduction tube 15 preferably extends. In this particular instance the eduction tube 15 comprises a rigid pipe section 21, a flexible section or hose 22 and a coupling 23 of any suitable construction for detachably connecting the sections 21 and 22.

Figures 3, 4:
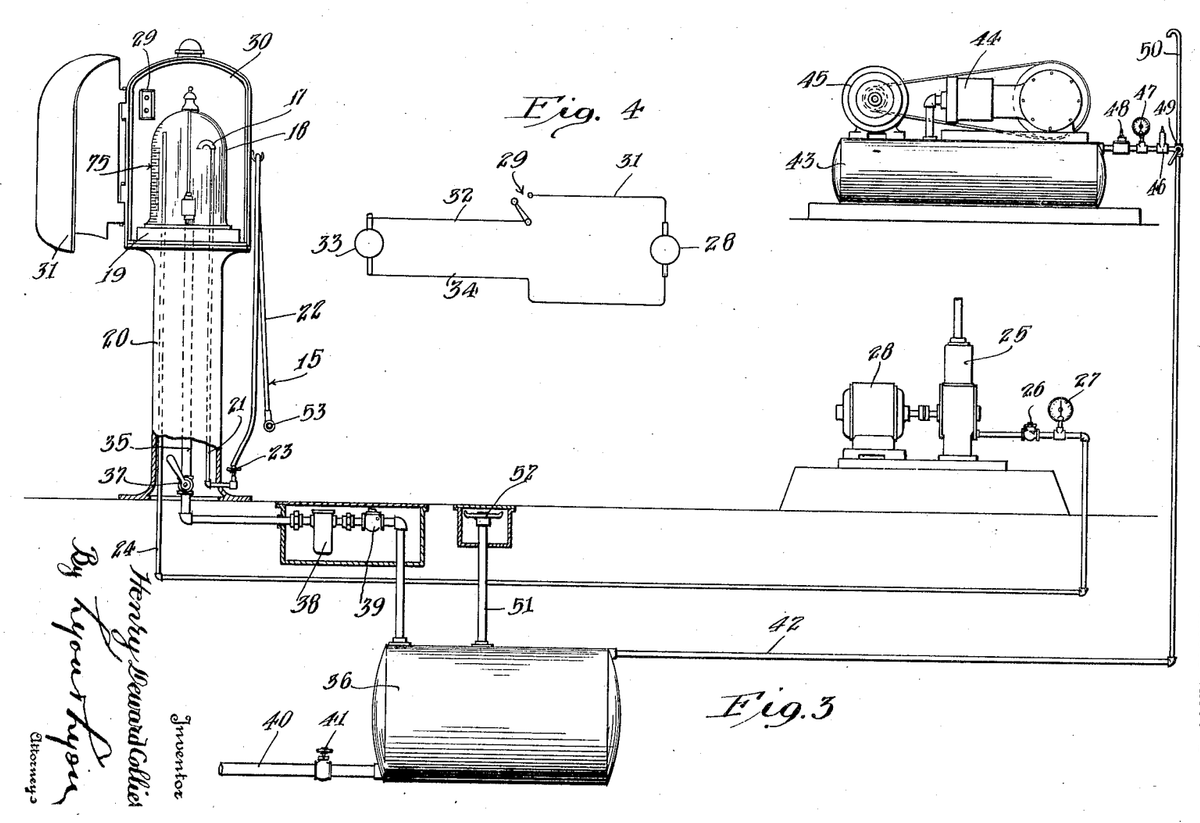
Fig. 3 is a more or less diagrammatic view of the apparatus and system, some of the parts of which are shown in Fig. 1. The standard on which the container is mounted and boxes that enclose certain underground parts of the apparatus are shown in section.
Fig. 4 is a diagram of electrical connections of the apparatus.

Extending upwardly through the standard 20 and through the base 19 into the upper portion of the container 18, is an air exhaust pipe or tube 24. The upper end of the tube 24 extends to a point above any level to which fluid will be permitted to rise in the bell jar, so that said fluid will not discharge into the tube 24. The other end of the tube 24 connects with the inlet side of an exhaust of vacuum pump 25, and said tube 24 is provided between the pump 25 and the bell jar with a check valve 26 and a vacuum gage 27 to indicate the degree of vacuum in the tube 24.

Suitable means are provided for operating the pump 25 and, in this instance, such means are embodied in an electric motor 28. The motor 28 is controlled by an electric switch 29 which may be positioned in any convenient place and, in this instance, is shown mounted on the wall of a cabinet 30 in which the bell jar is mounted. The cabinet 30 has a door 31 which, when open, exposes to view the bell jar and its contents.

Now referring more particularly to Fig. 4, it will be seen that the motor 28 is connected by a wire 31 to one terminal of a switch 29 which has its other terminal connected by a wire 32 to a source 33 of electric current. This source 33 is also connected by a wire 34 to the motor 28. When the switch 29 is closed the motor will be operated, thus producing a partial vacuum in the bell jar and in the eduction tube 15, or, in other words, a lower pressure than that upon the lubricant in the part of the vehicle that is to be drained.

Extending through the standard 20 and opening into the container 18 is the upper end of a drain pipe 35 which connects at its lower end with a reservoir or storage tank 36. The pipe 35 is provided with a cock 37 for manually controlling the flow of lubricant from the bell jar. In the pipe line 35 is a sediment separator 38 and a check valve 39 which closes when pressure in the bell jar is less than that in the reservoir 36 and opens when the first pressure is greater, allowing the lubricant to pass from the bell jar into the reservoir 36. If the check valve 39 is omitted or should get out of order the cock 37 will be used. The reservoir 36 may be connected by a pipe line 40 to another container or tank, not shown, at a higher level. The pipe line 40 is provided with a valve 41. If desired, the reservoir 36 may be connected by an air line 42 to the receiver 43 of an air compressor 44 operated by a suitable motor 45. The pipe line 42 is provided with a safety valve 46, a vacuum gage 47 and a reducing valve 48. The pipe line 42 is also provided with a three-way valve 49 and connected with said valve is a vent pipe 50 open to the atmosphere.

Connected with and extending up from the reservoir 36 is a pipe 51 closed at its upper end by an air tight cap 52. The pipe 51 is for the purpose of inserting a gage stick to ascertain the level of lubricant in the reservoir 36.

The means for connecting the eduction tube or hose 15 with the member which is to be drained of lubricant, as before stated, may be variously constructed. In this particular instance the eduction tube is provided at its intake end with a nozzle or tip 53 which may be similar in construction to the nozzle of a compressed air hose of the character used in supplying automobile tires with compressed air, though it is not necessary that the nozzle 53 be provided with a valve as is the nozzle of the compressed air hose. The tip 53 may be readily applied upon the upper end of a discharge conduit or stand pipe 54 which may be connected at its lower end by various means to the case holding the lubricant, whether such case be the crank case of the engine, or the gear case of the differential, or of the change speed gears. In this manner, upon raising the motor hood, a temporary union or substantially sealed joint may be conveniently established between the eduction tube 15 and the vehicle crank case.

In describing these connection means, reference will first be made to Figs. 7 and 8 which show a connection of a type that may be employed in all motor vehicles having a drain opening provided with taper threads. The drain opening is indicated at 55 and threaded thereinto is a tapered hollow plug 56 having a port or ports 57 near its outer end. The outer end of the plug 56 is closed by a solid plug 58 which also serves to hold in place an annular member 59, between which and the plugs 56 and 58 are interposed gaskets 60 to make leak-proof joints. The portion of the plug 56 adjacent to the ports 57 is reduced in diameter as indicated at 61 and the ring 59 is larger than the reduced portion so as to permit the lubricant to flow through the ports 57 into the annular member 59. And the annular member 59 is brazed or otherwise suitably secured to the lower end of the tube 54.

Figure 7:
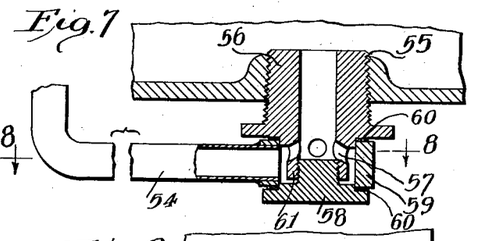
Fig. 7 is an enlarged sectional detail of a fragment of the lubricant containing case of the apparatus shown in Figs. 1 to 3, and the means for connecting said case with the lubricant eduction tube.
Figure 8:
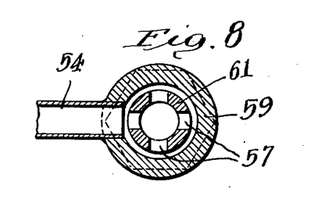
Fig. 8 is a plan section on the line indicated by 8—8, Fig. 7.
Figures 9, 10, 11, 12:
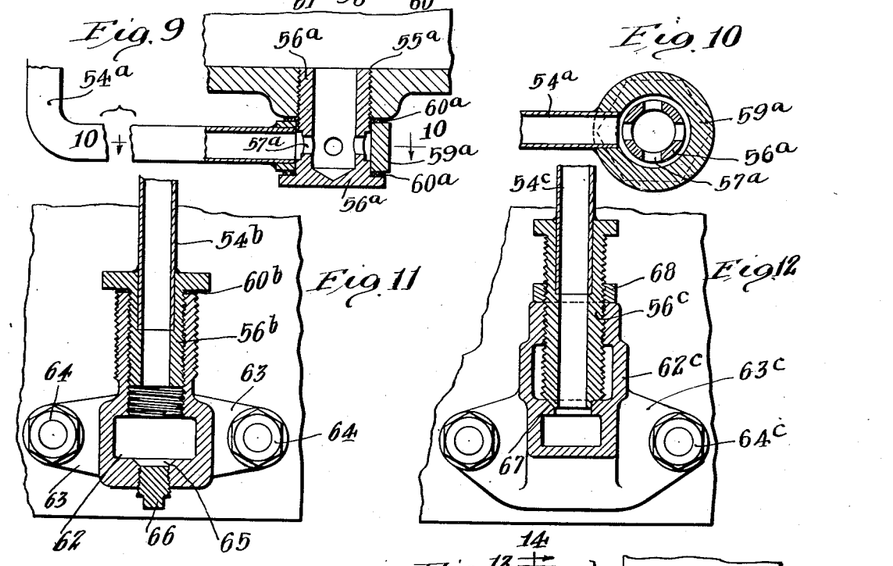
Fig. 9 is a sectional detail similar to Fig. 7 of a different form of connection means between the lubricant containing case and the eduction tube.
Fig. 10 is a plan section on the line indicated by 10—10, Fig. 9.
Fig. 11 is a sectional elevation of a third form of the connection means.
Fig. 12 is a sectional elevation of a fourth form of the connection means.

Now referring more particularly to Figs. 9 and 10, the parts corresponding in function with those shown in Fig. 7 will be indicated by the same reference numerals with the addition of the exponent "a". In this instance the hollow plug 56ª is provided with machine screw threads and is adapted to fit all motor vehicles using a solid plug and gasket, which solid plug is replaced by the plug 56ª.

In the construction shown in Figs. 7 to 10, inclusive, the drain openings are formed in the bottom of the crank case or other lubricant containing member 55 or 55ª. In a well-known type of motor vehicle the drain opening is in the side of the crank case and the construction shown in Fig. 11 will be employed, the parts that correspond in function to those shown in Fig. 7 being indicated by the same reference numerals with the addition of the exponent "b". In this instance a chamber 62 is provided with lugs 63 which are secured to the side of the crank case by stud bolts 64. The chamber 62 is provided in its bottom with a drain opening 65 closed by a small plug 66. Into the chamber 62 is threaded a hollow plug or nipple 56ᵇ which in turn is secured by brazing or any suitable means to the tube 54ᵇ that corresponds to the tube 54 in Fig. 7.

The construction shown in Fig. 12 is for still another well-known make of motor vehicle in which the drainage opening is in the side of the crank case, and the parts that function the same as those in Fig. 11 will be designated by the same reference numerals with the addition of the exponent "c". In this instance the plug or nipple 56ᶜ engages at its lower end a seat 67 in the chamber 62ᶜ and a locknut 68 is threaded on the outside of the plug 56ᶜ and bears against the upper end of the chamber 62ᶜ so as to firmly connect the plug to the chamber.

Figures 13, 14:
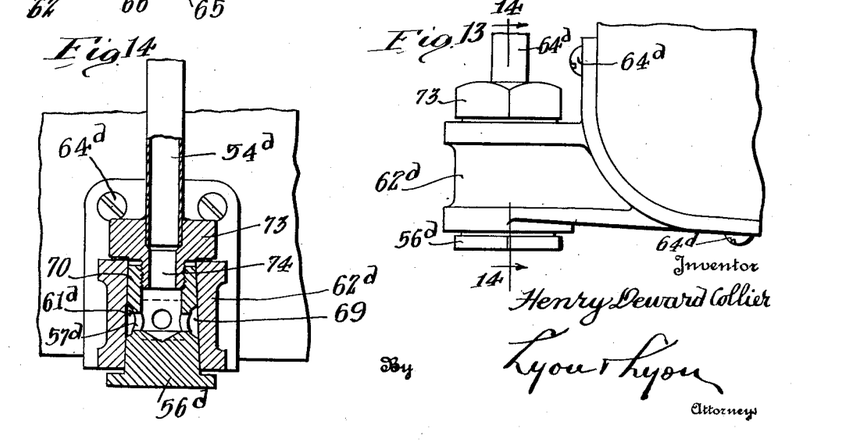
Fig. 13 is a side elevation of a fifth form of the connection means.
Fig. 14 is a sectional elevation on the line indicated by 14—14, Fig. 13.

A still different form of connection is illustrated in Figs. 13 and 14 for use with another well-known make of motor vehicle. The parts that function the same as those in Figs. 7 to 12 will be indicated by the same reference numerals with the addition of the exponent "d". In this instance the chamber 62ᵈ is secured by screws 64ᵈ to the crank case in position for the drain opening of the case to communicate with the interior of said chamber. The chamber has a tapered bore 69 in which fits a tapered hollow plug 70 having a part 61ᵈ of reduced diameter and a port or ports 57ᵈ positioned at the reduced portion so as to provide an annular chamber between the reduced portion and the wall of the bore 69. The plug 56ᵈ is seated tightly in place by an extension 73 of the plug which extension is screw-threaded into the upper end of the bore of the plug 56ᵈ. The plug extension 73 is provided with a bore 74 which communicates with the tube 54ᵈ that corresponds to the tube 54 in Fig. 7.

To assemble any of the connection means just described with the member on the vehicle that holds the lubricant, all that is necessary is to remove the solid plug, if such is provided to close the drain opening, and insert therein the appropriate special plug. If the connections are of the type shown in Figs. 11 and 12, the usual closure member as supplied by the manufacturer is replaced by the plug 56$^b$ or 56$^c$. It is to be understood that I have only illustrated and described a few of the different forms of connections that may be required with various motor vehicles now on the market.

The operation of the form of the invention illustrated in Figs. 1 to 4 and 7, is as follows:

When the operator of a motor vehicle desires to have the lubricant changed in the crank case of the motor, he will drive into a filling station and position his car adjacent to the standard 21, as illustrated in Fig. 1. Assuming that the cock 37 is open and the valve 41 closed, that the valve 49 is turned to permit air to flow from the pipe line 42 to the vent pipe 50 and that the crank case has been provided previously with the connection means 16 hereinbefore described, the attendant of the station will force the nozzle 53 of the eduction tube 15 over the upper end of the tube 54 and he will close the switch 29, thus setting the pump 25 into operation. This reduces the pressure in the container 18 below that in the crank case of the motor, causing the spent lubricant in the crank case to flow therefrom into the bell jar 18. As soon as a partial vacuum is formed in the bell jar 18, the check valve 39 will close automatically, thus preventing the lubricant as it discharges into the bell jar from running out of said bell jar. If desired, a graduated scale 75 may be provided on the bell jar or in connection therewith to indicate the quantity of lubricant drawn from the crank case. As soon as the crank case has been emptied, which can be readily noted by looking through the wall of the bell jar 18 at the discharge end 17 of the pipe 21, the attendant will open the switch 29 so as to stop operation of the pump. As soon as this is accomplished the pressure will rise in the container 18, permitting the check valve 39 to open and the contents of the container to flow therefrom through the pipe line 35 and sediment separator 38 into the reservoir 36. Then, if the crank case is to be flushed out with a cleansing oil or compound, such oil or compound will be poured into the crank case in the customary manner and this also will be forced out of the crank case by the attendant again closing the switch 29. He will then open the switch and the cleansing oil or compound will flow into the reservoir 36.

The attendant will then disconnect the nozzle 53 from the tube 54 and supply the necessary amount of fresh lubricant to the crank case to take the place of that which has been drawn off. Other motor vehicles will have their crank cases or other lubricant holding parts drained in the same manner, the reservoir 36 receiving the lubricant as before. When the reservoir 36 becomes filled, as will be ascertained by removing the cap 52 and inserting the gage stick, not shown, the valve 41 will be opened and the three-way valve 49 will be operated to admit compressed air to the pipe line 42 from the receiver 43, thus forcing the lubricant from the reservoir 36 through the pipe 40 into whatever tank or other receptacle is provided to receive it. The safety valve 46 may be set, for example, at fifteen pounds pressure and the reducing valve 48 at ten pounds.

It is to be understood that the air compressor 44 and its receiver 43 together with the motor 45 may be those that are already installed in the filling station for supplying compressed air to the compressed air hose used in inflating tires.

Figure 5:
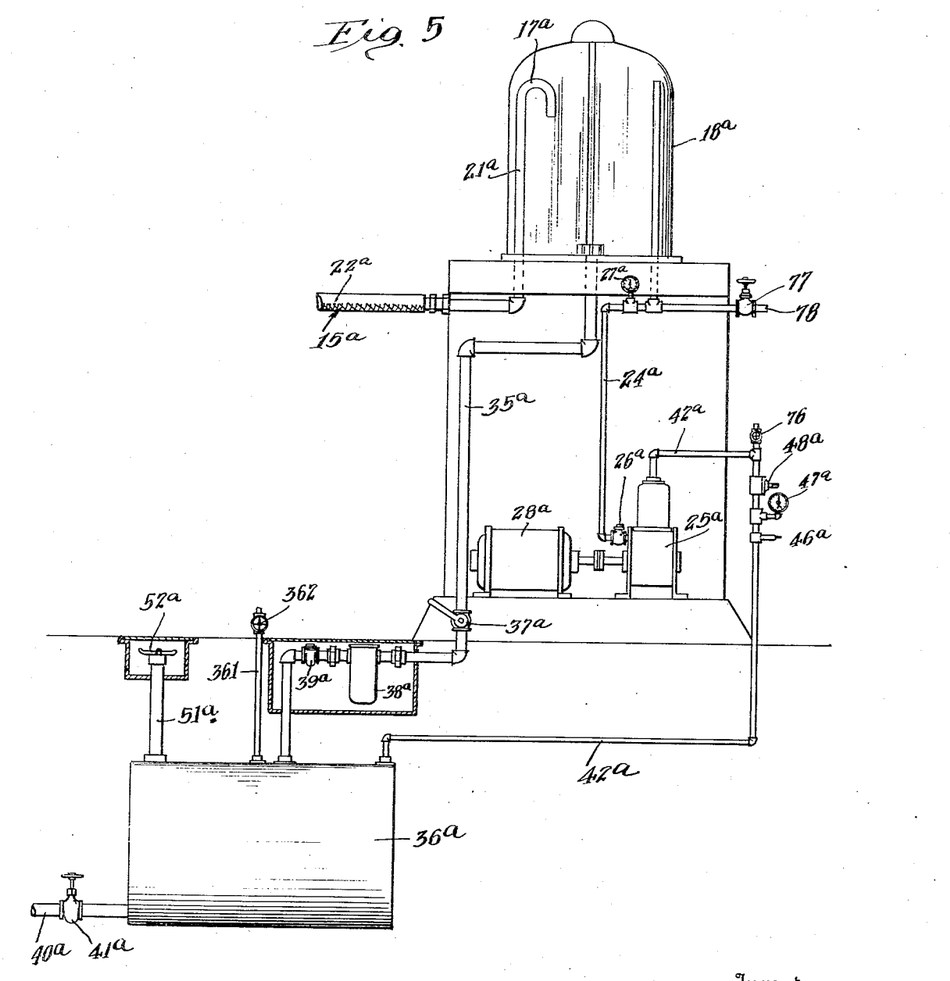
Fig. 5 is an elevation, similar to Fig. 3, of a different form of apparatus embodying the invention.

Now referring more particularly to the form of the invention shown in Fig. 5, the parts that function the same as those described above in connection with the form of invention shown in Fig. 3, will be indicated by the same reference numerals with the addition of the exponent "a". In this instance the air line 42$^a$ from the reservoir 36$^a$ is not connected with a separate receiver, as in Fig. 3, but connects with the exhaust side of the pump 25$^a$ so that said pump may be operated to force air into the reservoir 36$^a$ and thus expel the spent lubricant therefrom in a manner similar to that described above.

When the pump 25$^a$ is being operated to create a partial vacuum in the bell jar, a valve 76 provided on the pipe line 42$^a$ between the valve 48$^a$ and the pump 25$^a$, will be opened so as to exhaust air from the pump to the atmosphere. When the pump 25$^a$ is operating to force air into the reservoir 36$^a$, the valve 76 will be closed and a valve 77 will be opened, said valve being on an intake pipe 78 connected with the tube 24$^a$. Of course the pipe 78 is not absolutely necessary, as the air could be supplied to the pump 25$^a$ through the bell jar which would receive air through the tube 15$^a$. When the lubricant is flowing from the bell jar to the receiver 36$^a$, the air is vented from said reservoir through a pipe 361 having a valve 362. Otherwise than for these slight differences in operation, the form of invention illustrated in Fig. 5 will function the same as described above for Fig. 3.

Figure 6:
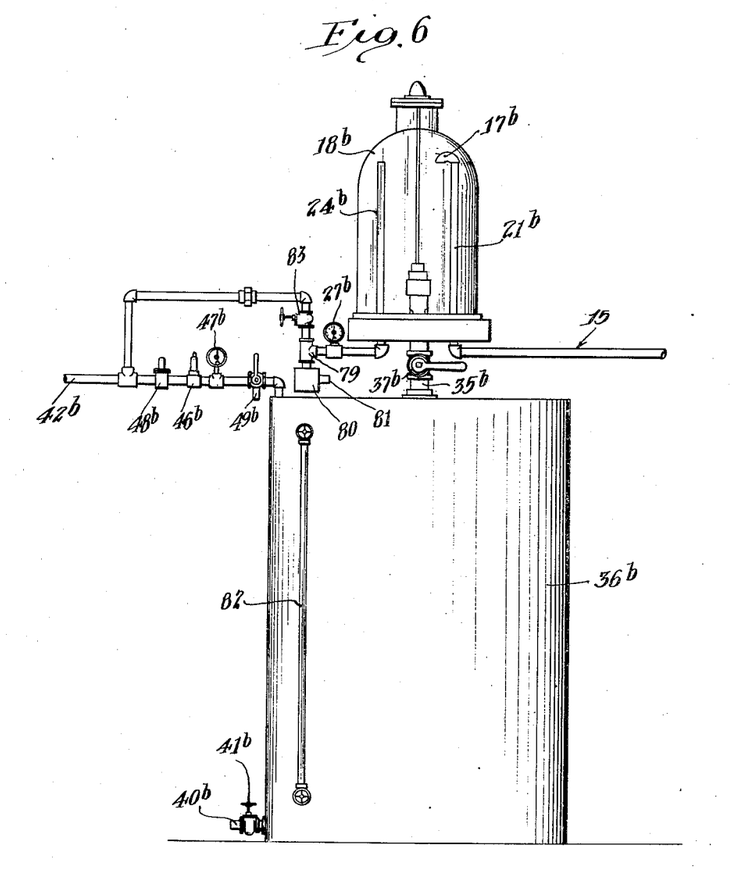
Fig. 6 is an elevation of a third form of the apparatus embodying the invention.

Now referring to the form of the invention illustrated in Fig. 6, the parts shown therein, that function the same as those described in connection with Fig. 3, will be designated by the same reference numerals with the addition of the exponent "b". In this instance, a partial vacuum is created in the bell jar 18$^b$ by an ejector action and the reservoir 36ᵇ itself functions as a standard to support the container in elevated position, the drain pipe 35ᵇ being connected with the upper end of the reservoir 36ᵇ. The tube 24ᵇ is provided with an ejector 79 of any suitable construction well understood in the art relating thereto. This ejector in turn is connected to an air exhaust muffler 80 which exhausts to the atmosphere as indicated at 81. The compressed air line 42ᵇ, it is to be understood, is connected to a suitable source of compressed air supply and this source may be, for example, the exhaust side of an air pump corresponding to the air pump 25 shown in Fig. 3. It will be evident that, when the air pump is operated, the ejector 79 effects suction of air from the container 18ᵇ, thus causing lubricant to flow into the container through the eductor tube 15 from the case that is being drained of lubricant. Likewise, it will be clear from the above description of the operation of the form of the invention shown in Fig. 4, that the three-way valve 49ᵇ may be operated to cause air to be supplied by the air pump to the reservoir 36ᵇ to discharge lubricant from said reservoir through the pipe 40ᵇ into any other suitable tank or container provided to receive it.

When lubricant is discharging from the bell jar 18ᵇ into the receiver 36ᵇ, air will be vented from said reservoir to the atmosphere by appropriate operation of the valve 49ᵇ.

Instead of employing a gage stick for determining the amount of lubricant in the reservoir 36ᵇ, the indications of an oil gage 82 are relied upon, said oil gage being provided on said reservoir. The tube 42ᵇ is provided with a valve 83 which will be opened when air is to be exhausted from the bell jar and closed when air is to be forced into the reservoir 36ᵇ.

In the illustrative embodiments of the above invention the discharge conduit 54 has been described as detachably connected. This is intended particularly for employment with used cars. In new cars it is contemplated that the discharge conduit 54 will be permanently incorporated by the manufacturer.

I claim:—

1. In a system for draining lubricant from motor vehicles, the combination of a container, a lubricant eduction tube discharging into the container, means to detachably connect the tube to a part of the vehicle to be drained, a drain pipe connected with the lower part of the container, means to produce a relatively lower pressure in the container than on the lubricant in said part to discharge the lubricant into the container, and a valve controlling the flow of lubricant into the drain pipe and operated into closed position by the difference in pressures in the container and drain pipe.

2. In a system for draining lubricant from motor vehicles, the combination of a container, means to discharge the contents of the container, means to connect the container to a part of the vehicle to be drained, and means to produce a lower air pressure in the container than on the lubricant in said part, the discharge means including a check valve closed toward the container by the difference in pressures above and below the valve.

3. In a system for drawing lubricant from motor vehicles, the combination of a container, a lubricant eduction tube discharging into the container, means to detachably connect the tube to a part of the vehicle to be drained, an exhaust tube leading from the container, an air exhaust pump having its intake side connected with the exhaust tube, a reservoir, a pipe leading from the container to the reservoir, a discharge pipe for the reservoir provided with a valve, an air compressor, a receiver connected with the air compressor, and a pipe connecting the receiver with the reservoir and provided with a valve.

4. In a system for drawing lubricant from motor vehicles, the combination of a container, a lubricant eduction tube discharging into the container, means to detachably connect the tube to a part of the vehicle to be drained, an exhaust tube leading from the container, an air exhaust pump having its intake side connected with the exhaust tube, a reservoir, a drain pipe leading from the container to the reservoir and provided with a valve, and a discharge pipe for the reservoir provided with a valve.

5. In a system for discharging used lubricant from vehicle motors, the combination with the lubricant holding member of the vehicle motor provided with a drain opening located in the bottom of such member, of a discharge conduit attached to and carried by the holding member, communicating with the said opening and extending to above the high level of the lubricant and to a position of ready access, a lubricant eduction tube having means at one end for readily establishing a union between the eduction tube and the discharge conduit and means to produce a partial vacuum in the eduction tube, whereby the used lubricant may be quickly withdrawn from the vehicle motor.

6. In a system for discharging used lubricant from vehicle motors, the combination with the lubricant holding member of the vehicle motor provided with a drain opening located in the bottom of such member, of a discharge conduit attached to and carried by the holding member, communicating with the said opening and extending to above the high level of the lubricant and to a position of ready access, a lubricant eduction tube located at a suitable service station and having means at one end for readily establishing a union between the eduction tube and the discharge conduit and also having means to produce a partial vacuum in the eduction tube, whereby the used lubricant may be quickly withdrawn from the vehicle motor.

7. In a system for discharging lubricant from the crank cases of vehicle motors, a discharge conduit attached to the crank case and adapted to communicate with the drain port thereof and extending upwardly to a point above the highest level of the liquid in the crank case and to a point accessible from above said case upon raising the motor hood, a lubricant eduction hose adapted to be applied to the discharge end of said conduit, a lubricant receiver with which said hose communicates, and means to create a differential pressure within and without the crank case to cause the lubricant to discharge from the crank case through the hose to the lubricant receiver.

8. In a system for discharging lubricant from the crank cases of vehicle motors, a discharge conduit attached to the crank case and adapted to communicate with the drain port thereof and extending upwardly to a point above the highest level of the liquid in the crank case and to a point accessible from above said case upon raising the motor hood, a lubricant eduction hose located at a suitable service station and adapted to be applied to the discharge end of said conduit, a lubricant receiver also located at said service station and with which said hose communicates, and means to create a differential pressure within and without the crank case to cause the lubricant to discharge from the crank case through the hose to the lubricant receiver.

9. In a system for discharging lubricant from the crank cases of vehicle motors, a lubricant discharge conduit constituting part of the vehicle and communicating into the crank case below the body of lubricant therein, said discharge conduit extending to a point on the vehicle readily accessible without getting under the vehicle and adapted to normally prevent the egress of lubricant from the crank case, a lubricant eduction tube adapted to be readily connected at one end to the discharge end of the conduit, and means to produce a reduced pressure in the eduction tube, whereby the lubricant may be quickly withdrawn from the vehicle motor.

10. In a system for discharging lubricant from the crank cases of vehicle motors, a lubricant discharge conduit constituting part of the vehicle and communicating into the lowest part of the crank case, said discharge conduit extending to a point on the vehicle readily accessible without getting under the vehicle, a lubricant eduction tube adapted to be readily connected at one end to the discharge end of the conduit, and means to produce a partial vacuum in the eduction tube, whereby the lubricant may be quickly withdrawn from the vehicle motor.

11. In a system for discharging lubricant from the crank cases of vehicle motors, a lubricant discharge conduit constituting part of the vehicle and communicating into the lowest part of the crank case, said discharge conduit extending to a point on the vehicle readily accessible without getting under the vehicle, a lubricant eduction hose connected at one end to a lubricant receiver located at a station for servicing motor vehicles, the free end of the hose being readily connectable to the discharge end of the said lubricant discharge conduit of the vehicle, and means to create a differential pressure within and without the crank case of the vehicle to cause the lubricant to rapidly discharge from the crank case through the discharge conduit and eduction hose to the lubricant receiver.

12. In a system for discharging lubricant from the crank cases of vehicle motors, a lubricant discharge conduit constituting part of the vehicle and communicating into the lowest part of the crank case, said discharge conduit extending to a point on the vehicle readily accessible without getting under the vehicle, a transparent lubricant receiver supported at a readily observable elevation in a station for servicing motor vehicles, said lubricant receiver having a capacity sufficient to hold and exhibit the lubricant discharged from a single crank case and adapted to be emptied for individually exhibiting the lubricant discharged from different vehicles, an eduction tube connected at one end to said lubricant receiver and readily connectable at its opposite end to the discharge end of the conduit of the vehicle, and means to create a differential pressure within and without the crank case of the vehicle to cause the lubricant to rapidly discharge from the vehicle to the lubricant receiver through the connected discharge conduit and eduction tube.

Signed at San Francisco, Cal., this 2nd day of February, 1924.

HENRY DEWARD COLLIER.